United States Patent Office 3,462,399
Patented Aug. 19, 1969

3,462,399
METHOD OF COPOLYMERIZING ETHYLENE AND PROPYLENE
Demetreos N. Matthews, Bloomfield, N.J., assignor to Uniroyal, Inc., New York, N.Y., a corporation of New Jersey
No Drawing. Continuation-in-part of application Ser. No. 304,692, Aug. 26, 1963. This application Mar. 19, 1965, Ser. No. 441,358
Int. Cl. C08f *1/56, 15/04, 15/40*
U.S. Cl. 260—80.78    15 Claims

ABSTRACT OF THE DISCLOSURE

In the polymerization of alpha-olefins, especially copolymerization of ethylene and propylene (with a diene such as dicyclopentadiene if desired) in solution, using a coordination-type catalyst based on a vanadium salt (e.g., $VCl_4$, $VOCl_3$) and an organometallic compound (particularly a soluble catalyst in which the organometallic compound is an alkylaluminum sesquihalide), the activity of the catalyst can be enhanced, and the molecular weight of the polymer can be regulated, by adding certain materials, particularly organic nitrates, organic nitrites, azoxy compounds (e.g., azoxybenzene), organic polyvalent iodine compounds, oil-soluble organic compounds of transition metals in a higher valence state, and alkyl disulfides.

---

This application is a continuation-in-part of my copending application Ser. No. 304,692, filed Aug. 26, 1963, and now abandoned.

This invention relates to improved catalysts for the polymerization of olefins, and methods for the polymerization of olefins using these improved catalysts. More particularly the invention comprises catalysts obtained by the interaction of:

(1) a vanadium salt,
(2) an organometallic compound of a type represented by the formulae (a) RMgX (Grignard reagent), where R is a hydrocarbon radical having from 1 to 12 carbon atoms, e.g., an alkyl radical such as methyl, ethyl, etc. or an aryl radical such as phenyl, naphthyl, etc., and X is a halogen atom,
(b) $LiAlR_4$, where R is as previously defined, and
(c) $R_AAl_2X_B$, where R and X are as previously defined, A is a number from 2 to 6, B is a number from zero to 4, and $A+B=6$, and (3) a material selected from the group consisting of (a) organic nitrates, nitrites and azoxy compounds.
(b) organic polyvalent iodine compounds,
(c) oil-soluble organic compounds of transition metals in a higher valence state, and
(d) alkyl disulfides, at least one of the substances (1) and (2) containing at least one halogen atom.

In the following, chemicals (1) and (2), i.e., the vanadium salt, and the Grignard reagent or the organoaluminum compound, or their interaction product, will frequently be referred to as the primary catalyst system, and chemical (3) will be referred to as the activator or, sometimes, as the regulator.

The invention has particular reference to the use, along with the described primary catalyst ingredients (1) and (2), of an additional chemical (3), as defined above, which has the surprising effects of (A) activating the catalyst and (B) serving as a regulator of molecular weight of the polymer. The invention comprises any method by which the chemical (3) is reacted with the reaction product of (1) and (2) in the presence of the monomer or monomers. In this way it is ensured that catalyst activation and/or molecular weight regulation of the polymer is achieved.

Polymerization catalysts which are the interaction products of (1) a compound of a metal of Groups IV–B and V–B of the periodic table of the elements (see "Handbook of Chemistry and Physics," 41st Edition, pages 448–9, published by Chemical Rubber Publishing Company, Cleveland, Ohio) and (2) an organometallic compound of a metal of Group III–A of the periodic table are well known through patents and other publications of recent years. Some of these disclosures, such as Schreyer, U.S. 2,962,451, and Ziegler, Belgian Patent 553,655, show catalysts falling within the scope of the primary catalyst systems of the present invention. Schreyer, among others, shows catalysts comprising a vanadium salt and an alkylaluminum halide, for the polymerization of ethylene or propylene. Ziegler shows catalysts from $VOCl_3$-trialkylaluminum for the copolymerization of ethylene with higher alpha-olefins. Sometimes the catalysts are insoluble or heterogeneous, and sometimes they are soluble, depending on the exact composition.

The above-described prior catalyst systems, and indeed all other prior art catalysts of this type known to the present inventors, are deficient in that: (a) they show a low catalyst efficiency (here expressed as weight of polymer produced per unit weight of vanadium compound per unit time); (b) the polymerization rate is undesirably slow unless relatively high concentrations of catalyst are used; and, (c) in the case of a soluble catalyst, the activity decreases, often rapidly, during the course of the polymerization. These deficiencies are more serious in the copolymerization of ethylene with propylene or with other olefins having more than two carbon atoms, than in the homopolymerization of ethylene. Furthermore, conventional catalyst systems frequently do not afford an opportunity to regulate or modify the molecular weight of the polymer, especially when only moderate concentrations of catalyst are used.

In British Patent 886,368, United States Rubber Company, published Jan. 3, 1962, improved catalyst systems using $VCl_4$ or $VOCl_3$ with either dialkylaluminum halide or alkylaluminum dihalide alone, or mixtures of the two, are disclosed which show a catalyst efficiency in the copolymerization of ethylene and propylene 10–100 times as great as that of the aforementioned prior art catalysts. Even the improved catalysts of British Patent 886,368 are amenable to substantial further improvement by the addition of the "activators" or "regulators" of the present invention, especially as regards the maintenance of catalytic activity over a relatively long period of polymerization, and as regards the production of polymer of low molecular weight.

The present invention is directed to making more effective and more efficient a primary catalyst system comprising a vanadium salt (1) and an organometallic material (2) as defined previously, by the combination therewith of an activator/regulator (3) selected from those set forth above.

Typical examples of the organic nitrates, nitrites and azoxy compounds are: alkyl nitrates, such as butyl and iso-amyl nitrates, alkyl nitrites, such as iso-amyl nitrite, azoxybenzene;

Typical examples of the organic polyvalent iodine compounds are iodosobenzene, and iodosobenzene diacetate;

There may be mentioned as typical examples of oil-soluble organic compounds of transition metals of higher valence state, the cobalt (III), ferric, manganese (III), and chromium (III) acetylacetonates; t-butyl chromate; ferric dichlorobenzoate;

A typical example of as alkyl disulfide is n-butyl disulfide.

The olefins which are polymerized by the present process include ethylene, propylene, and similar alphaolefins, having the formula $CH_2=CHR$ in which R is hydrogen or a hydrocarbon radical, particularly a saturated alkyl hydrocarbon radical having from 1 to 8 carbon atoms; e.g., butene-1, hexene-1, 4-methylpentene-1, 5-methylhexene-1, and 4-ethylhexene-1.

A preferred form of the invention is directed to the copolmerization of ethylene and propylene to yield rubbery products. An especially preferred practice of the invention contemplates the production of unsaturated, sulfur-vulcanizable, rubbery terpolymers of ethylene, propylene, and a diene such as dicyclopentadiene, methylcyclopentadiene dimer, 1,4-hexadiene, 11-ethyl-1, 11-tridecadiene, 1,9-octadiene, 1,5-cyclooctadiene, or other suitable copolymerizable dienes such as are disclosed in British Patent 880,904 to Dunlop Rubber Co., Oct. 25, 1961; U.S. 2,933,480 to Gresham and Hunt, Apr. 19, 1960; U.S. 3,000,866 to Tarney, Sept. 19, 1961; and Belgian Patents 623,698 and 623,741 to Montecatini, Feb. 14, 1963. These disclosures are herewith incorporated by reference. Preferred terpolymers contain from 1 to about 25% (more preferably about 2% to about 15%) by weight of dicyclopentadiene or the like. The remaining portion of the interpolymer generally contains from about 25% to about 75% by weight of propylene, the remainder being ethylene.

The primary catalyst system which is to be activated in accordance with the method of my invention comprises, as indicated previously, a reaction product of (1) a vanadium salt and (2) a Grignard reagent or an organoaluminum compound. Among the vanadium salts which may be used, there may be mentioned vanadium halides, oxyhalides, alkoxides and acetylacetonates. Specific examples of these salts are vanadium dichloride, vanadium trichloride, vanadium tetrachloride or tetrabromide, vanadium oxydichloride, vanadium oxytrichloride, alkyl vanadates (especially where the alkyl group contains 1–12 carbon atoms, e.g., n-butyl vanadate), vanadyl or vanadium acetylacetonate, and the like. Also, salts based on mixtures of more than one of the foregoing types, such as dialkyl halovanadates, e.g., dibutyl chlorovanadate, and alkyl dihalovanadates, e.g., butyl dichlorovanadate, may be used. In many cases, preferred vanadium compounds are vanadium oxytrichloride, vanadyl or vanadium acetylacetonate, lower alkyl vanadates (alkyl groups of 1–4 carbon atoms) and halovanadates, especially chlorovanadates (mono- and di-chloro).

Such a vanadium compound (1) is combined with an organometallic compound (2) to give the primary catalyst system in which at least one of the components (1) and (2) must contain at least one halogen atom. Unfortunately such a conventional primary catalyst system, as indicated above, is frequently not as effective as would be desired, and may soon become inefficient or inactive. Also, it does not always provide a polymer having the desired properties.

The present invention is based on my surprising discovery that the primary catalyst system (a) is made more effective, (b) maintains its activity for a longer period, or (c) can be reactivated after it begins to slow down, if these is added a chemical (3) of the kind described. The added chemical unexpectedly serves as a regulator of molecular weight, too.

While I do not desire to limit the invention to any particular theory of operation, it appears possible that the ability of the chemicals (3) to activate the primary catalyst is a consequence of an oxidizing action whereby the chemical (3) transforms at least a part of the vanadium into a valence state of $+3$ or more. Although the effect is not entirely understood, it appears as though the primary catalyst, as initially produced by the reaction of the vanadium compound (1) and the organo-metallic compound (2), is originally or may soon become inactive (because of the absence of vanadium in a valence state higher than $+2$) but transformation of some of the vanadium to a higher valence state by chemical (3) reactivates the catalyst. Whatever the explanation, it is indeed surprising that the chemical (3) has the here described beneficial effect on the primary catalyst. The benefits of the use of such a chemical (3) in accordance with the invention are especially important in making ethylene-propylene and ethylene-propylene-diene interpolymers. Such interpolymerization is, in general, much more difficult to effect efficiently than the simple homopolymerization of, for example, ethylene.

It will be understood that, instead of mixing the vanadium compound with an organoaluminum compound directly ot form the primary catalyst system, I may produce an equivalent system indirectly by the method of Carrick [J. Am. Chem. Soc. 82, 3883 (1960)], involving, for example, mixing tetraphenyltin, aluminum halide, and vanadium oxytrichloride, whereby phenylaluminum halide is believed to be formed in situ. Such a mixture may be activated in accordance with the present invention.

I emphasize that, for purposes of the present invention, the primary catalyst ingredients (1) and (2) should first be combined to form the primary catalyst system and that thereafter the primary catalyst system be acted upon by the chemical (3) as such. If the chemical (3) were appreciably prereacted with an individual component of the primary catalyst system prior to introduction of the third component, the desired highly active catalyst would not be obtained.

It will be understood that the empirical formula $R_AAl_2X_B$ used to describe the organoaluminum compounds is intended to include any of a wide variety of compounds or mixtures of compounds that might result, for example, from bringing together trialkylaluminum compounds, aluminum trihalides and/or alkylaluminum halides. For example, equimolar mixtures of monoalkyl-aluminum dihalide and dialkylaluminum monohalide, or equimolar mixtures of trialkylaluminum and aluminum trihalide, may be regarded as producing the alkylaluminum sesquihalide, $R_3Al_2X_3$. A mixture of trialkylaluminum and dialkylaluminum monochloride may be regarded as providing a material of the formula $R_5Al_2Cl$. It should be noted that the formula $R_AAl_2X_B$ as defined permits the use of trialkylaluminum as such, but not of aluminum trihalide as such. It is understood that such aluminum compounds are here represented by bimolecular formulas having two Al atoms.

The preferred primary catalyst system for use in producing binary and ternary copolymers of ethylene and propylene, in the present invention, is a soluble catalyst (by which I mean soluble in organic hydrocarbons, including the monomers to be polymerized), formed by interaction of vanadium oxytrichloride and an alkylaluminum sesquihalide. By alkylaluminum sesquihalide I mean either the alkylaluminum sesquihalide as such, i.e., $R_3Al_2X_3$, or a mixture containing a substantial amount of the sesquihalide. Such mixture may be represented by the empirical formula $R_AAl_2X_B$ where, in the preferred catalyst, A is from 1.2 to 4.8, B is correspondingly from 4.8 to 1.2, and $A+B=6$, and may be formed by admixing appropriate amounts of dialkylaluminum halide with alkylaluminum dihalide, or by mixing appropriate amounts of trialkylaluminum with aluminum trihalide. In the preferred alkylaluminum halides the alkyl group is a lower alkyl, typically of 1 to 4 carbon atoms, and the halogen is chlorine.

In preferred soluble primary catalyst systems, the molar ratio of aluminum to vanadium is at least 5:1, and preferably at least 10:1, higher ratios such as 20:1, 35:1, 50:1, etc., may also be used. If desired, even higher ratios of aluminum to vanadium, e.g., 200:1 or higher, may be employed, especially in those cases where the concentration of vanadium compound used is very small.

These preferred soluble primary catalyst systems are remarkable for their ability to form an amorphous, rubbery ethylene-propylene interpolymer of uniform composition, and particularly for their ability to form an amorphous ethylene-propylene-diene interpolymer that is sulfur-vulcanizable to yield a high quality rubber stock.

Although for many purposes the soluble catalyst compositions have been described as preferred, especially for the interpolymerization of ethylene and propylene, it will be understood that in other cases, notably the homopolymerization of propylene, the insoluble or heterogeneous type of catalyst may be used in my invention.

The amount of chemical (3) employed as activator for the primary catalyst system in accordance with the invention is, in general, not especially critical. Surprisingly small amounts of chemical (3), e.g., about 0.01 mole of chemical (3) per mole of vanadium compound (1), may be sufficient in many cases to produce a noticeable activating effect. Usually it is preferred to use somewhat larger amounts, typically from about 1 to about 10 moles of chemical (3) per mole of vanadium compound (1), but it will be understood that considerably more chemical (3) than this may be employed, if desired. As much as about 50 moles, or more, can be employed, especially when the mole ratio of organometallic compound (2) to vanadium compound (1) is equal to or greater than 50 or when regulation of the molecular weight is desired. But in any case, the moles of chemical (3) should not exceed the moles of metal in the amount of organometallic compound (2) taken.

In any given case, the optimum amount of chemical (3) will depend upon the specific composition of the primary catalyst, and the particular chemical (3) used, as well as such variables as the exact polymerization procedure. More than one chemical (3) may be used if desired.

All or part of one or both of the primary catalyst ingredients (1) and (2) will generally be present in the monomeric material at the time the chemical (3) is added or within a short space of time after the addition of the chemical (3). In this way the chemical (3) does not have an opportunity to prereact appreciably with either of the primary catalyst ingredients in the absence of the other. Prolonged contact of the chemical (3) with one of the primary catalyst ingredients in the absence of the other results in lower polymer yields. One method for carrying out the invention is to combine the primary catalyst ingredients (1) and (2) in the presence of at least a portion of the monomer or monomers and then to add the chemical (3). Another method is to pre-mix the primary catalyst ingredients in the absence of monomers and thereafter to combine the mixture with monomers and chemical (3). In addition to the above methods of delayed addition of the chemical (3), one may add all three catalyst ingredients (1), (2) and (3) simultaneously to the monomer or monomers. Another method which can be used is to add the chemical (3) to either of the primary catalyst ingredients (1) or (2) just prior to the addition of the other; however, the other must then be added promptly, before appreciable reaction takes place between (3) and the primary ingredient which was added first. In all cases the monomers need not be present until the third ingredient is added.

As indicated previously, the chemical (3), added to the conventional catalyst system in accordance with the invention, is inherently capable of performing two important functions: (A) activation, and (B) regulation or modification.

To appreciate the activation function (A), it is helpful to consider first the behavior of the soluble primary catalyst system as conventionally used. In conventional practice the activity of the soluble catalyst, i.e., the rate at which the catalyst produces polymer, is often very satisfactory at the start, but falls off more or less rapidly as the polymerization progresses. However, addition of a small quantity of an activator chemical (3) according to the present invention prevents such decay in activity and restores the activity of the catalyst. Likewise the addition of activator to a heterogeneous catalyst system increases its activity.

As for the modifying or regulating function (B), the conventional catalyst system tends to give polymer of very high molecular weight. This feature is detrimental to the processing qualities of the polymer. However, the molecular weight of polymer formed when the chemical (3) is added to the catalyst system may be remarkably reduced, so that an easily processable polymer is readily obtained. In fact, liquid polymers can be obtained in this way.

From the standpoint of using the chemical (3) essentially for its activating effect, the usual practice is to add it after the catalyst has become partially spent, thereby revitalizing the catalyst. Thus, repeated small additions of chemical (3) may be made as the polymerization proceeds, to maintain optimum catalyst efficiency throughout the reaction.

From the standpoint of using the chemical (3) essentially for its regulating or modifying effect, it may be added at any time after which it is desired to produce low molecular weight material. For instance, if it is desired to make polymer having a regulating molecular weight over the entire reaction period, addition of chemical (3) is begun at the start of the polymerization. On the other hand, delayed addition of chemical (3) will result in the production of relatively high molecular weight polymer prior to the addition and lower molecular weight polymer subsequent to the addition, so that the final product is a mixture of high and low molecular weight polymers. This may be desirable under some circumstances. The preferred method, both for best yields and for optimum control of molecular weight, is to add the chemical (3) continuously or in small increments as the polymerization proceeds rather than to add a large amount all at once.

The polymerization process is conveniently carried out in an inert solvent, although an added solvent is not essential as the monomers being polymerized may serve as the solvent. In general, the normal solvents used in ionic coordination type polymerizations may be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure, concentration of catalyst, and the like, are concerned.

One preferred practice of the invention contemplates continuously interpolymerizing ethylene, propylene and a diene such as dicyclopentadiene. The aforementioned is accomplished by introducing the primary catalyst ingredients (1) and (2) separately into a solution of the monomers in an inert organic solvent. The resulting solution is passed continuously through a polymerization zone, wherein the chemical (3) is added. A stream containing terpolymer is withdrawn from the polymerization zone. These steps may be repeated in one or more subsequent polymerization zones into which the reaction stream, withdrawn from the previous polymerization zone, is successively introduced. There may be incrementally or continuously introduced into each zone more of the primary catalyst ingredients, and/or more activator-regulator (3), as required, to maintain the system at peak efficiency consistent with economical utilization of catalyst and production of terpolymer of the desired average molecular weight. Additional amounts of one or more of the monomers may be introduced in each subsequent reaction zone, if desired. The stream issuing from the final reaction zone, in the form of a thick solution, or cement, may be processed in the usual way to separate the polymer and remove catalyst residues.

Schreyer, U.S. 2,962,451, teaches catalysts made by mixing a vanadium compound in which the vanadium is in a high valence state, i.e., +3 or higher, with an organometallic compound in amount sufficient to reduce the vanadium, at least in part, to a valence state of less than +3. While such a catalyst may be activated in accordance with the present invention, it is not essential for purposes of the invention that the vanadium compound employed have a valence of at least +3. On the contrary, vanadium compounds in which the vanadium has a valence of less than +3, such as vanadium dichloride, may be used. However, it will be understood that in such a case the product obtained by mixing the vanadium compound (1) with the organometallic compound (2) does not become an active catalyst for producing ethylene copolymers until the chemical (3) of the invention is added. This is in contrast to the product obtained by mixing a vanadium +3 compound with the organometallic compound, which product is an active catalyst for ethylene copolymerization even before the chemical (3) is added. Although vanadium compounds in which the vanadium has a valence of less than +3 may be used in the invention, it is preferred to use vanadium compounds in which the vanadium has a valence of at least +3. Such compounds are particularly advantageous from the standpoint of the described continuous polymerization procedure in which the catalyst is introduced into a first polymerization zone without chemical (3), and the chemical (3) is added subsequently after a certain amount of polymerization has taken place.

The following examples will serve to illustrate the practice of the invention in more detail. The efficiency of the catalyst is calculated in all examples as grams of polymer produced per gram of $VOCl_3$.

EXAMPLE 1

This example shows activation of a pre-mixed catalyst by means of iso-amyl nitrate in the formation of ethylene-propylene rubber.

In a one-liter flask equipped with condenser, stirrer, thermometer, dropping funnel and a tube for the subsurface feeding of gaseous monomers, 350 cc. of purified benzene was saturated at atmospheric pressure and ambient temperature by an equimolar feed consisting of high purity ethylene and propylene, using a total feed rate of four liters per minute. Without interrupting the monomer feed, 16 ml. of a benzene solution containing 1 millimole of $Et_3Al_2Cl_3$ and 0.1 millimole of $VOCl_3$ (premixed catalyst) was added. After five minutes the temperature had risen only about 2° C. Thus far, the example follows known catalyst addition procedures and yet no reaction has taken place.

At this point the dropwise addition of a benzene solution containing 0.1 millimole of iso-amyl nitrate was begun. The temperature started to rise immediately, rising as much as 19°. After thirty minutes, 15 cc. of isopropanol was added to destroy any active catalyst. The solution was then treated with 10 cc. of a 5% solution of antioxidant, 2,2'-methylenebis(4-methyl-6-t-butylphenol), in toluene, and the polymer was precipitated in methanol. After being chopped in a Waring Blendor the polymer was vacuum-dried at 40° C.; yield, 16.1 g. In this example the catalyst efficiency was 932. No crystallinity could be detected by X-ray. The weight ratio of propylene to ethylene in the polymer was 39/61, and the intrinsic viscosity (at 135° C. in Tetralin) was 1.44.

EXAMPLES 2–6

Examples 2–6 are herewith set forth to illustrate various other chemicals (3) that are operable with the invention.

In the examples below, the procedure was substantially as described in Example 1. The technique of mixing the primary catalyst ingredients in the absence of monomers, i.e., pre-mixing, was used in order to accentuate the difference between the relatively poor yields obtained in the absence of chemical (3) as in the prior art, and the very high yields obtained by the use of chemical (3) in accordance with my invention. Thus, this method affords a good screening test for activators.

The procedure of Example 1 has also been followed using other oil-soluble organic compounds of transition metals in a higher valence state in place of the one used in Example 5. Among such compounds which have been used in accordance with the invention and have given results similar to those of Example 5 are the cobalt (III), iron (III), manganese (III), and chromium (III) acetylacetonates; t-butyl chromate (VI), and iron (III) dichlorobenzoate.

| Example number | 2 | 3 | 4 | 5 | 6 |
|---|---|---|---|---|---|
| Catalyst | $Et_3Al_2Cl_3$ | $Et_3Al_2Cl_3$ | $Et_3Al_2Cl_3$ | $Et_3Al_2Cl_3$ | $Et_3Al_2Cl_3$ |
| Mmole | 1 | 1 | 1 | 1 | 1 |
| Cocatalyst | $VOCl_3$ | $VOCl_3$ | $VOCl_3$ | $VOCl_3$ | $VOCl_3$ |
| Mmole | 0.1 | 0.1 | 0.1 | 0.1 | 0.1 |
| Ratio, Al/V | 20/1 | 20/1 | 20/1 | 20/1 | 20/1 |
| Solvent | Benzene | Benzene | Benzene | Benzene | Benzene |
| Milliliters | 350 | 350 | 700 | 350 | 350 |
| Feed ratio, P/E | 2/2 | 2/2 | 2/2 | 2/2 | 2/2 |
| Total feed liters/min | 4 | 4 | 4 | 4 | 4 |
| Chemical (3)/mmole | A/0.1 | B/0.1 | C/1 | D/0.1 | E/0.1 |
| Ratio chemical (3)/V | 1 | 1 | 10 | 1 | 1 |
| Diene | | | I | | |
| Milliliters | | | 1.5 | | |
| Reaction temp. range, °C | 20–35.5 | 22–43 | 21–32 | 21–32 | 16–29 |
| Reaction time, min | 30 | 30 | 30 | 30 | 30 |
| Yield, g | 12.4 | 12.1 | 17.8 | 8.0 | 7.0 |
| Efficiency | 720 | 700 | 1,029 | 462 | 405 |
| Percent crystallinity, X-ray | None | None | None | None | None |
| Weight ratio P/E, infra-red | 36/64 | 37/63 | 35/65 | 33/67 | |
| Intrinsic viscosity (135° C.) | 1.98 | 1.81 | 1.73 | 2.85 | |
| Iodine number | | | 11.1 | | |

KEY.—A. Iso-amyl nitrite. B. Azoxybenzene. C. Iodosobenzene diacetate. D. Ferric acetylacetonate. E. n-Butyl disulfide. I. Dicyclopentadiene.

The remaining examples illustrate the use of chemical (3) as a molecular weight regulator.

EXAMPLE 7

This example illustrates the use of a high ratio of chemical (3) to vanadium (50/1), using iso-amyl nitrate.

In a two-liter flask equipped as in Example 1, 700 cc. of purified n-heptane was saturated at atmospheric pressure and ambient temperature by an equimolar feed of high purity ethylene and propylene, using a total feed rate of 4 liters per minute. Without interrupting the monomer feed, one millimole of $Et_3Al_2Cl_3$ and 0.02 millimole of $VOCl_3$ (as n-heptane solutions) were added consecutively (Al/V=100/1). Immediately, the dropwise addition of 1.0 millimole of iso-amyl nitrate (as 60 ml. of n-heptane solution) was begun and continued throughout the polymerization, a period of 30 min. After 30 minutes, 15 ml. of isopropanol was added to destroy the active catalyst. The solution was then treated with 10 cc. of a 5% solution of antioxidant, 2,2'-methylenebis-(4-methyl-6-t-butylphenol), in toluene, and the polymer was flocculated in one liter of a 50/50 (by volume) mixture of methanol and acetone. After being chopped in a Waring Blendor, the polymer was vacuum dried.

| | |
|---|---|
| Yield _____grams__ | 13.9 |
| Efficiency | 4000 |
| P/E | 26/74 |
| I.V. (135° C. in Tetralin) | 2.60 |

EXAMPLE 8

This example illustrates the use of a high ratio of chemical (3) to vanadium (50/1), using iso-amyl nitrate.

In a two-liter flask equipped as in Example 1, the procedure of Example 7 was followed except that iso-amyl nitrite was used as the chemical (3) in place of iso-amyl nitrate.

| | |
|---|---|
| Yield _____grams__ | 6.2 |
| Efficiency | 1790 |
| P/E | 30/70 |
| I.V. (135° C. in Tetralin | 2.95 |

EXAMPLE 9

This example illustrates the use of a high ratio of chemical (3) to vanadium (50/1), using azoxybenzene.

In a two-liter flask equipped as in Example 1, the procedure of Example 7 was followed except that azoxybenzene was used as chemical (3).

| | |
|---|---|
| Yield _____grams__ | 16.6 |
| Efficiency | 4800 |
| P/E | 32/68 |
| I.V. (135° C. in Tetralin) | 2.57 |

EXAMPLE 10

This last example of polymer molecular weight regulation again illustrates the use of a high ratio of chemical (3) to vanadium (25/1), using cobalt (III) acetylacetonate.

In a two-liter flask equipped as in Example 1, the procedure of Example 7 was followed except that cobalt (III) acetylacetonate was used as the chemical (3).

| | |
|---|---|
| Yield _____grams__ | 12.2 |
| Efficiency | 3530 |
| P/E | 26.64 |
| I.V. (135° C. in Tetralin) | 2.36 |

For comparison, a control run was made, identical to Examples 7, 8, 9 and 10 except that no chemical (3) was added, with the following results:

| | |
|---|---|
| Yield _____grams__ | 4.8 |
| Efficiency | 1390 |
| P/E | 31/69 |
| I.V. (135° C. in Tetralin) | 4.5 |

The data show the relatively low yield, and the undesirably high molecular weight as measured by the intrinsic viscosity, which result when no regulator chemical (3) is used.

As stated above, mixtures of ethylaluminum dichloride and diethylaluminum chloride which contain no more than 20% of free dichloride or monochloride can be used in place of the sesquichloride. In place of an organoaluminum compound in the primary catalyst system, one can use a Grignard reagent such as phenylmagnesium bromide, ethylmagnesium chloride, and the like, or lithium aluminum tetraalkyls such as lithium aluminum tetraethyl, and the like, with similar results. Similarly, the system of Carrick (tetraphenyltin+aluminum halide+vanadium compound) may be used as a means of providing in situ a combination of organo-aluminum halide and vanadium compounds, to be activated in accordance with the method of the invention.

Having thus described my invention, what I claim and desire to protect by Letters Patent is:

1. A method of copolymerizing ethylene and propylene comprising contacting said monomers in solution in an inert organic solvent with a catalyst comprising:
   (1) $VOCl_3$,
   (2) an alkylaluminum sesquihalide, and
   (3) material selected from the group consisting of alkyl nitrates, alkyl nitrites, aromatic azoxy compounds, iodosobenzene, iodosobenzene diacetate, cobalt acetylacetonate, ferric acetylacetonate, manganese acetylacetonate, chromium acetylacetonate, t-butyl chromate, ferric dichlorobenzoate, and alkyl disulfides, the moles of (3) being equal to or less than the moles of aluminum in the amount of (2) taken, the mole ratio of aluminum to vanadium being from 5:1 to 200:1, the said material (3) being added subsequently to combining (1) and (2), and the said catalyst being soluble in organic hydrocarbon solvents.

2. A method as in claim 1 in which a copolymerizable diene is also present, whereby a terpolymer of ethylene, propylene and said diene is formed.

3. A method as in claim 2 in which the said diene is dicyclopentadiene.

4. A method as in claim 1 in which (3) is an alkyl nitrate.

5. A method as in claim 4 in which the alkyl nitrate is iso-amyl nitrate.

6. A method as in claim 1 in which (3) is an alkyl nitrite.

7. A method as in claim 6 in which the said alkyl nitrite is iso-amyl nitrite.

8. A method as in claim 1 in which (3) is an aromatic azoxy compound.

9. A method as in claim 1 in which (3) is a polyvalent idoine compound selected from iodosobenzene and iodosobenzene diacetate.

10. A method as in claim 9 in which the said iodine compound is iodosobenzene diacetate.

11. A method as in claim 1 in which (3) is an oil-soluble organic compound of a polyvalent transition metal in a higher valence state selected from cobalt acetylacetonate, ferric acetylacetonate, manganese acetylacetonate, chronmium acetylacetonate, t-butyl chromate and ferric dichlorobenzoate.

12. A method as in claim 11 in which the said oil-soluble organic compound of a polyvalent metal is ferric acetylacetonate 13. A method as in claim 1 in which (3) is an alkyl disulfide.

14. A method as in claim 13 in which the said alkyl disulfide is n-butyl disulfide.

15. A method of copolymerizing ethylene and propylene comprising contacting said monomers in a solution in an inert organic solvent medium with a catalyst comprising:
   (1) $VOCl_3$, (2) an alkylaluminum sesquihalide, and
(3) azoxybenzene,
the moles of (3) being equal to or less than the moles of aluminum in the amount of (2) taken, the mole ratio of aluminum to vanadium being from 5:1 to 200:1, the said material (3) being added subsequently to combining (1) and (2), and the said catalyst being soluble in organic hydrocarbon solvents.

References Cited

UNITED STATES PATENTS

| | | |
|---|---|---|
| 3,303,175 | 2/1967 | Achon. |
| 2,772,259 | 11/1956 | Hagemeyer. |
| 2,913,445 | 11/1959 | Bown et al. |
| 3,045,001 | 7/1962 | Berger. |

FOREIGN PATENTS

| | | |
|---|---|---|
| 809,717 | 3/1959 | Great Britain. |

JAMES A. SEIDLECK, Primary Examiner

R. S. BENJAMIN, Assistant Examiner

U.S. Cl. X.R.

260—88.2